United States Patent [19]

Garabedian

[11] 4,334,850
[45] Jun. 15, 1982

[54] APPARATUS FOR MAKING A STRESS-FREE PLASTIC ARTICLE

[76] Inventor: Armen Garabedian, 8-22 Astoria Blvd., Long Island City, N.Y.

[21] Appl. No.: 219,436

[22] Filed: Dec. 23, 1980

Related U.S. Application Data

[60] Division of Ser. No. 929,304, Jul. 31, 1978, Pat. No. 4,243,368, which is a continuation-in-part of Ser. No. 817,048, Jul. 19, 1977, Pat. No. 4,104,101, and Ser. No. 647,832, Jan. 9, 1976, abandoned, which is a continuation of Ser. No. 424,654, Dec. 14, 1973, abandoned, which is a continuation of Ser. No. 141,495, May 10, 1971, abandoned, which is a division of Ser. No. 805,093, Feb. 14, 1969, abandoned, which is a continuation of Ser. No. 536,140, Mar. 21, 1966, abandoned, which is a continuation-in-part of Ser. No. 473,342, Jul. 20, 1965, Pat. No. 3,383,265, said Ser. No. 817,048, is a continuation of Ser. No. 279,964, Aug. 11, 1972, abandoned, which is a continuation-in-part of Ser. No. 141,495, , abandoned.

[51] Int. Cl.³ .............................................. A01J 21/00
[52] U.S. Cl. .................................. 425/388; 425/389; 156/285
[58] Field of Search ................ 425/389, 388; 156/285

[56] References Cited

U.S. PATENT DOCUMENTS 3,833,333  9/1974  Britten ................................ 425/389
3,891,738  6/1975  Shen .................................... 264/120

Primary Examiner—James R. Hall
Attorney, Agent, or Firm—Pennie & Edmonds

[57] ABSTRACT

Disclosed is an apparatus for making stress free plastic articles from plastic particles such as powder utilizing heat and pressure in which a quantity of plastic particles is supplied to a first member, a flexible diaphragm is disposed in opposed relationship to said first member with said plastic particles therebetween, a microporous air release means is positioned between said plastic particles and said flexible diaphragm, a fluid-like pressure is applied to said diaphragm to cause said diaphragm to apply an even fluid-like pressure through said air release means to said plastic particles, heat is applied to said plastic particles while under said fluid-like pressure and any entrapped gases between the particles is vented by means of the air release means. The pressure and heat are controlled to effect a consolidation of the plastic particles into the article. A second diaphragm may be used on the opposite side of said first diaphragm and either one or both of said diaphragms may be a sealed envelope to which fluid pressure is applied. The plastic article produced by the apparatus is substantially free of all stresses.

8 Claims, 5 Drawing Figures

APPARATUS FOR MAKING A STRESS-FREE PLASTIC ARTICLE

CROSS REFERENCE TO RELATED APPLICATIONS

This application is a divisional of application Ser. No. 929,304, filed July 31, 1978, now U.S. Pat. No. 4,243,368 issued Jan. 6, 1981 which application is a continuation-in-part of Ser. No. 647,832, filed Jan. 9, 1976, and is also a continuation-in-part of Ser. No. 817,048, filed July 19, 1977. The history of these two parent applications is as follows:
   i. Ser. No. 647,832 was filed Jan. 9, 1976 (abandoned) as a continuation of Ser. No. 424,654, filed Dec. 14, 1973 (abandoned) as a continuation of Ser. No. 141,495, filed May 10, 1971 (abandoned); and
   ii. Ser. No. 817,048 was filed July 19, 1977 (now U.S. Pat. No. 4,104,101) as a continuation of Ser. No. 279,964, filed Aug. 11, 1972 (abandoned) as a continuation-in-part of Ser. No. 141,495, filed May 10, 1971 (abandoned);

U.S. Ser. No. 141,495, filed May 10, 1971 (from which both said applications Ser. Nos. 647,832 and 817,048 are derived was filed as a divisional of Ser. No. 805,093, filed Feb. 14, 1969 (abandoned) as a continuation of Ser. No. 536,140 filed Mar. 21, 1966 (abandoned) as a continuation-in-part of Ser. No. 473,342, filed July 20, 1965 (now U.S. Pat. No. 3,383,265). The references cited in above U.S. Pat. No. 4,243,368 are noted for the record.

FIELD OF THE INVENTION

This invention belongs to the field of apparatus for forming plastic articles including sheets from plastic particles and to welding the same under heat and pressure also utilizing plastic powders. Previous known apparatus for forming plastic articles including sheets from plastic particles have experienced a variety of difficulties. Many plastics are difficult or impossible to mold into articles or to form into sheets, particularly, thin sheets called films. Also, it is difficult to weld many plastic sheets by conventional electronic heating or other "thermowelding" techniques without having the joint exhibit a thickness greater than the thickness of the sheet. Further, such techniques for welding have generally been applicable only to certain relatively thin materials such as films. For example, the homopolymer chlorotrifluoroethylene may be thermowelded only in very thin thicknesses. In such conventional welding techniques the resulting joints frequently exhibit varying strengths and degradation of the plastic along the weld due to excessive or unequal heating, or unequal pressure. Still further, such conventional welding techniques frequently result in holes through the material at or adjacent the weld either during formation or subsequently during use which phenomenon is sometimes referred to as "holing through". When the sheet material to be welded has variable thicknesses these difficulties in conventional welding techniques are compounded even when the thickness variation is slight. Nor do the conventional welding systems produce a weld over the entire width of the overlapped edges. As a result, the unwelded portions of the edges are subject to movement in use by wind or other air currents which deteriorate the weld, often to the point where the weld separates. Previous efforts to overcome these problems with conventional welding by using wider welded areas (more overlap) greatly reduces the speed of joining which is detrimental commercially.

Much of what has been said above with respect to welding also applies to the forming of shaped articles including sheets from plastic particles. Still further, when forming plastic articles or sheets from plastic particles by the use of conventional apparatus for the articles or sheets produced have stresses or strains built into them by the method of formation except in those instances where the plastic being used is a monomer or a liquid-like material or are formed by solvent or casting methods such as those methods using organosols or plastisols for the production of the article or the sheet. Solvent methods of formation are expensive, generally slow, and are not applicable to a great many plastic resins. Polymers having millions molecular weight, for example, have proven very difficult to form into articles or sheets by many conventional techniques and, indeed, it is practically impossible to produce large thin sheets from such millions molecular weight polymers directly from the plastic particles. While certain plastics have been formed into articles, particularly sheets, that are nearly stress or strain free by the solvent or liquid phase methods mentioned above, such processes have not been widely used with solid polymers except with polymers such as polyvinyl chloride. Still further, such stress or strain free products (hereinafter referred to as "stress free" products) have not heretofore been produced from polymers having millions molecular weight. In an effort to produce stress free plastic articles including sheets, attempts have heretofore been made to release the stresses built into the product during its formation by certain expensive after-treatments such as heating the product to a temperature suitable to relieve the stresses therein. Generally this involves heating the product to near and sometimes into the melt phase for extended periods. Such treatments (especially if the product is not restrained during treatment) can induce dimensional changes in the product which render it useless. The present invention eliminates stress as a problem. Prior to the present invention the best quality of sheet (including film) plastics produced from pelletized or ground plastic powder has been made by the compression method; however, due to its large capital investment and costly operation such sheets produced by such compression method have priced themselves out of the market place except for very special applications. In the compression method the pressures required may reach many thousands of pounds per square inch with the recommended pressures for polystyrene homopolymer sheets, for example, being from 1,000 to 10,000 p.s.i. (70.3–703 kg/cm$^2$) and those for acrylics being on the order of 2,000–5,000 p.s.i. (140–352 kg/cm$^2$).

BACKGROUND ART

It is known from U.S. Pat. No. 3,383,265 that two plastic sheets can be welded together by placing them in a chamber having at least one flexible wall and heating with infrared or other heat while the flexible wall is pressed against the joint until it melts into the weld. Such process and method are, however, not disclosed as being useful for forming products from particulate material, much less stress free products.

DISCLOSURE OF THE INVENTION

The present invention proposes to overcome the deficiencies of the prior art by producing plastic articles which are stress free directly from plastic particles by supporting said particles upon a suitable support such as a mold or platen, heating the plastic particles while applying to said plastic particles fluid pressure including applying said fluid pressure substantially uniformly to said supported plastic particles while the same are heated to a temperature sufficient to cause said particles to melt and form said article, and venting any air or gasses contained in the plastic powders during said heating and pressing. The apparatus utilizes a flexible member which may be a diaphragm alone or a diaphragm that is one face of a closed envelope. The apparatus also includes an air release means which is, preferably, in two parts although a single element air release means is also contemplated. When the air release means is of two parts, one is a wire cloth or screen and the other is a microporous parting sheet. The microporous parting sheet may advantageously be comprised of a fiberglass fabric coated with polytetrafluroethylene, thus providing a sheet with a myriad of minute openings therethrough.

In using the apparatus of this invention to produce stress free articles such as sheets, the pressures required are often as low as 50 p.s.i. (3.52 kg/cm$^2$) and less including use of only that force generated by the differential between atmospheric pressure and a readily obtainable partial vacuum.

The articles including sheets produced by this invention are stress free and degradation is greatly reduced or eliminated. The articles may be made of such diverse plastics as polyethylene, polyvinyl chloride, polystyrene, polypropylene, the acrylics, and others, including, particularly, polymers of millions molecular weight such as millions molecular weight polyethylene, which are otherwise very difficult to process. Dissimilar plastics even such widely dissimilar materials such as the polystyrenes and polyvinyl chlorides may be superimposed in one or more layers and produced as one solid sheet.

Still further, the product produced by this invention exhibits the characteristics on its surface of the mold or platen support. In one specific example the product is produced having a mirror surface of extremely high quality which exhibits high smoothness or polish comparable to that of polished glass by having been formed on a platen having a surface with an extreme polish. Such a surface may be glass or highly polished metal and may, if desired, have patterns engraved or otherwise produced therein for reproduction in the final plastic article.

To produce a sheet suitable for use as a mirror the plastic material in comminuted state is disposed on a suitable mold or platen in a layer of desired thickness. Over this layer of comminuted plastic particles or powder is placed the above-mentioned microporous parting sheet and over this is placed the wire screen. The plastic is then heated to at least its fusion or melt temperature and while so heated there is applied across the gas release means (comprised of the microporous parting sheet and the wire screen) a fluid-like pressure sufficient to cause the plastic material to fuse to a coherent sheet. The fluid pressure applied to this sandwich may be exerted through a flexible diaphragm or by means of two separate diaphragms one of which is placed beneath the platen and the other of which is placed above the wire screen. Fluid pressure is then applied to the diaphragm to cause the same to press evenly in a fluid like manner over the entire surface of the layer of plastic particles.

The diaphragm may be either a single flexible member placed against one or both sides of the sandwich (comprising the mixture, plastic particles, microporous parting sheet, and wire screen) or the diaphragm may be one face of a sealed envelope in which case either a single envelope pressing against the air release means or a pair of opposed sealed envelopes (with the sandwich therebetween) may be utilized.

The pressure may be either liquid such as water or hydraulic fluid under pressure or gas such as air or an inert gas under pressure. In either event, the fluid pressure may be applied to the outer surfaces of the diaphragm or diaphragms which transmits the same to the plastic particles. Alternatively, and particularly when two diaphragms are used which are not the faces of sealed envelopes, the periphery of the diaphragms may be sealed together and the air between the two evacuated whereby the pressure is ambient pressure and the amount thereof is determined by the differential between ambient pressure and the degree of vacuum applied between the peripherally sealed diaphragms. When one or two envelopes are used, the fluid pressure is applied by placing the fluid within the envelope under pressure which pressure the flexible diaphragm face of the envelope transmits fluidly to the plastic particles.

During the step of applying fluid pressure (by any of the described mechanisms or methods) to the heated plastic material, all areas of the plastics material are contacted with a pressure that is even and substantially uniform throughout. Any gas (including air or moisture) present in the plastics material is exhausted under the heat and pressure and the same is vented by means of the air release means comprised of the wire cloth or screen and the microporous parting sheet. It should also be noted that a porous or multiperforated thin flexible metal sheet may be used in place of the wire screen. Alternatively, a polytetrafluoroethylene (PTFE) coated wire screen or minutely perforated or porous flexible metal sheets coated with PTFE may be used to replace both the wire screen and the microporous parting sheet.

As the plastics material melts and consolidates, the significant movement is that towards solidification thus avoiding the gross lateral flow that in other processes causes the introduction of various stresses into the product upon cooling. If the sheet is produced on a glass plate master the fluid pressures applied are so even that the product is produced without any damage or breakage occurring to the glass master. The glass master is preferably tempered or heat resistant glass.

When producing a mirror, as one specific embodiment, there is then applied to that face of the finished sheet which exhibits the polish of the master (i.e. that face which was against the master) a layer of reflective metal. The reflective metal may be sprayed silver and in order to protect the same there is applied thereover a transparent abrasion resistant coating. This abrasion resistent coating may advantageously be a solution of glass resin polymer applied evenly over the metal layer which resin is then cured by means of radiant heat. In one specific example the plastic sheet may be a polystyrene homopolymer of approximately 0.09" (2.29 mm) in thickness with a layer of silver sprayed onto its polished surface and the silver layer coated with a film of 40% glass resin and 5% catalyst in solution in butanol.

When welding sheets of plastics together previous disadvantages mentioned above including "holing through" are eliminated while producing a weld with little or no thickness variation being apparent in the final product not even in the weld and also having a mirror or other smooth surface as desired. Further, the invention permits the welding of dissimilar plastics, even those as diverse as polyethylene and polyvinyl chloride.

When the invention is used to join two sheets or pieces of plastic material, they may be placed in juxtaposed edge to edge relationship or in overlapped relationship with powdered plastic between the meeting or overlapped edges. A fluid-like pressure is then applied to the joint while heating the same into or close to the melting temperature. As in the case of producing an article, the fluid pressure is applied by either one diaphragm or by two opposed diaphragms either or both of which may be one face of a sealed envelope. Under the applied heat and pressure the weld is formed and the particles lose their discreet identities and assume the ultimate desired shape.

Where the materials to be joined are different plastic polymers the use of correspondingly different plastic powders has been found particularly advantageous. For example, different plastic powders have been used in which the plastic of one powder corresponds to the plastic of one of said polymers and the plastic of the other powder corresponds to the plastic of the other of said polymers. At the joint or junction between the two materials the plastic powders may advantageously be arranged in a graded manner. That is to say that the powder adjacent the first of said materials is comprised of the same plastic as the first of said materials while the plastic powder adjacent the second of said materials is the same polymer as the second plastic polymer. Between these extremes the concentration of one of said powders increases and the other decreases in a gradual manner until midway between the two materials to be joined the powder comprises a mixture of substantially equal amounts of the two different polymers. The entire assembly is then subjected to a uniform fluid pressure with applied heat to affect a welding of the joint and a melting and fusion of the powders with each other and with the adjacent (juxtaposed or overlapped) edges of the materials being joined. Alternatively, in many applications the powders may be supplied at the joint without such gradation toward the center.

After the applicaton of the plastic powders to one of the platens the platens are moved toward each other until a light pressure is applied to the layer of plastic particles. Thereafter the pressure is applied to the diaphragm or the envelope as described above. The diaphragm contacts the plastic powder with an even fluid pressure while heat is applied. The fluid pressure is substantially uniform over all of the plastic particles while the applied heat is sufficient to melt and consolidate the particles of the powder. It will be seen that the same basic method is used whether an article, a sheet, a weld or other joint is being produced.

The time required to form the article including a sheet or to make suitable welds will in part depend upon the particular plastic or plastics being worked, the thickness of the final product and like considerations. After applying heat and pressure as described above for a sufficient length of time to produce the article the pressure is released from the diaphragm (or envelope) and the platens are separated permitting the removal of the product.

There is far less or practically no degradation of the plastic whether in forming an article or making a weld since the diaphragm or diaphragms effectively exclude virtually all air from contact with the plastic. The air release means such as the PTFE coated glass fiber fabric having many minute pinholes and the wire cloth or screen described above also helps the escape of air so that the plastic is formed or welded in the absence of air with the result that degradation is greatly reduced or eliminated.

The apparatus comprises a frame having mounted thereon upper and lower platens at least one of which is covered with a flexible impermeable diaphragm or envelope. The diaphragm or envelope may be of any suitable material which will withstand the pressure and heat of operation including suitably selected metal sheets, plastic sheets, plastic and fabric combinations or the like. Metal alloys having extremely low coefficients of expansion are particularly useful for the diaphragm or the diaphragm wall of the envelope. When the diaphragm or diaphragm face of the envelope is of metal thicknesses from about 0.002" (0.05 mm) to 0.0075" (0.19 mm) have been found adequate. However, thicker diaphragms may be used as well with up to about 0.06" (1.5 mm) being contemplated. Thicknesses of 0.020" (0.51 mm) to 0.035" (0.89 mm) are generally sufficient.

The heat may be supplied to one or both platens in a number of ways. Common heat bars or heat elements of the electrical resistance type are satisfactory in many applications although a more versatile means of supplying heat is by using infrared radiation in wave lengths from 7,500 Å to 6 microns or more. Since such infrared radiation lends itself readily to concentration, absorption, transmission, and refraction over the areas to be heated by use of known optical and physical means such infrared radiation heating is more versatile than ordinary electrical resistance heating elements. In either event with either system quite accurate temperature control is possible from less than about 200° F. (94° C.) to an excess of about 2,000° F. (1093° C.) which latter temperature far exceeds any normal temperature requirement when working with plastics.

DETAILED DESCRIPTION OF THE DRAWINGS

The invention will be fully understood by those skilled in the art from the following description and drawings in which.

DETAILED DESCRIPTION OF THE INVENTION

Figure 1:
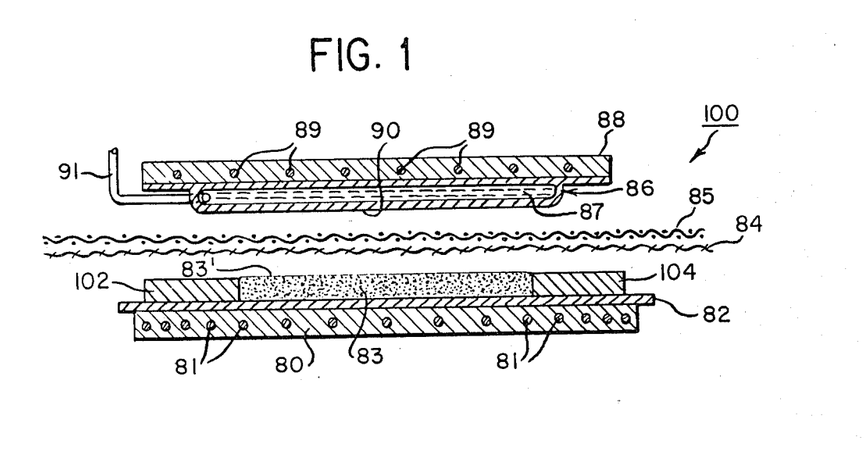
FIG. 1 illustrates schematically the production of a wide sheet by use of plastic powders.

In FIG. 1, there is shown an apparatus 100 comprising a lower platen 80 equipped with heating elements 81. The heating elements 81 may be electrical resistance heaters or, alternatively, may be tubes through which a heating fluid is pumped. A second platen 88 is positioned in opposed relationship to the platen 80. The platen 88 also incorporates heating elements 89 either by way of resistance heaters or tubes through which the heating fluid is pumped. Any of a number of suitable heat sources may be used in place of or in addition to the heating cores 81,89. For example, infrared radiation from any suitable source such as electrical bars, quartz tube heaters or the like are particularly versatile because of the ease of controlling, concentrating, transmitting and absorbing the same on the material to be heated by use of known optical and physical techniques. However, any source of heat can be adapted for use in this invention.

The platens 80 and 88 are mounted for relative movement toward and from one another by movement of one or both thereof. Secured to one of the platens 80,88, preferably the upper platen 88 as shown, is a flexible envelope 86 containing a fluid 87. The envelope 86 includes a front face of diaphragm 90. The diaphragm 90 and the entire envelope 86 may be of any suitable material which will withstand the pressure and heat of operation including suitably selected metal sheets, plastic sheets, plastic and fabric combinations or the like. In some instances, metal alloys having extremely low coefficients of expansion are particularly useful for the diaphragm and for the entire envelope. However, in most applications it has been found that high coefficient of expansion materials, particularly copper and some stainless steels are very suitable. When a metal is used it has been found that thicknesses from about 0.020" (0.51 mm) to 0.035" (0.89 mm) are adequate. However, thicknesses of up to about 0.06" (1.5 mm) are also useful. The interior of the envelope containing the fluid 87 communicates through a suitable conduit 91 with a source of fluid under pressure (not shown). The fluid may be a liquid such as water, hydraulic fluid, heat transfer fluid or the like or, alternatively, the fluid may be gaseous in which event air, or an inert gas such as nitrogen are suitable. The pressure source is selected depending upon the type of fluid (liquid or gaseous) which is to be utilized. A polished plate 82 is placed upon the platen 80 for the formation of a sheet of plastic. It will be appreciated that with suitable mold release agents the polished plate 82 may be dispensed with and the sheet formed directly upon the platen 80; however, the polished plate 82 is preferred. Members 102 and 104 on the plate 82 confine the plastic particles 83 which preferably comprise a finely ground powder. As will be apparent to those skilled in the art, in a batch type operation where a single sheet is to be formed the members 102 and 104 extend around the periphery of the platen 80 and the plate 82 to confine the plastic particles 83 on all sides. However, when a continuous or substantially continuous sheet is to be formed the platens 80 and 88 can be elongated and comprise the adjacent converging runs of two conveyor-like structures so that the platens 80 and 88 not only move toward and from each other but also move longitudinally along with each other at the same rate. In the latter event, the members 102 and 104 are positioned only at the lateral side edges of the platen 80 as shown.

The apparatus also includes a breathable microporous sheet 84 which is placed immediately above the plastic particles 83. The sheet 84 comprises a fabric material made of fiberglass and coated with PTFE in such a manner that the sheet has a myriad of minute pin holes substantially invisible to the naked eye extending therethrough throughout substantially the entire extent of the sheet. Positioned over the microporous parting sheet 84 is a fine woven wire cloth or screen 85. Alternatively, the element 85 may be a thin, flexible, porous or minutely perforated metal sheet. As will be apparent in the following description, the microporous parting sheet 84 and the wire screen 85 together comprise an air release means to release entrapped air from the layer of plastic particles 83 during formation of the sheet. The microporous parting sheet 84 and the wire screen 85 may be single sheets of material placed over the particle layer 83 in a batch operation or each may be a continuous track of material in the event the sheet is to be formed substantially continuously.

While the above description refers to a two part air release means, a one part air release means as above described is also contemplated. In such case the elements 84 and 85 are replaced by a single PTFE coated sheet comprising a porous metal sheet or wire screen.

In operation, a layer of plastic particles 83 is spread substantially evenly in the area defined by the members 102 and 104 which layer is spread to a thickness substantially equal to or slightly greater than that of the members 102 and 104. The heating elements 81 or 89 or both are then energized to heat the platens 80 or 88 or both, and in the case of the platen 88 in order to heat the fluid 87 and the diaphragm 90 as well. While either platen 80 or 88 may be heated as described or both may be heated, it is sometimes sufficient that the lower platen 80 be heated whereby the heat is transferred through the polished plate 82 to the plastic particle layer 83. The platens 80 and 88 are then brought toward each other with the microporous parting sheet 84 and the wire screen 85 positioned therebetween. It will be appreciated that the layer of particles 83 together with the polished sheet 82, microporous parting sheet 84, and wire screen 85 comprise a "sandwich" located between the two platens 80 and 88.

When the platens 80 and 88 have been brought together sufficiently so that the diaphragm 90 is applying a firm pressure on the layer 83 of plastic particles through the wire screen 85 and microporous parting sheet 84, then pressure is supplied through the conduit 91 to the envelope 86 and thus to the diaphragm 90. Under the heat supplied by the platen 80 (or the platen 88 or both) and the pressure applied by the diaphragm 90 under pressure from the fluid 87, the plastic particles melt and consolidate into the plastic sheet. There is no lateral flow of plastic, only movement together to consolidation thus eliminating flow lines that produce stress. During this operation the diaphragm 90 insures that all areas of the layer 83 of particulate plastic material are under uniform pressure. After a suitable time, the platen 80 and 88 are separated, and the sheet produced from the layer of particles 83 is removed from the apparatus.

The particle size is preferably below about 40 mesh, although, generally, the finer the powder used the better the results obtained, but, in any event, the powder should be free flowing so that there is an easy leveling of the plastic particle layer when the particles are applied initially. The pressures used will generally be below about 50 p.s.i. (3.52 kg/cm$^2$), with 40 p.s.i. (2.81 kg/cm$^2$) being typical though this will vary depending upon the material. The temperature best used is usually above the melt and will depend upon the particular plastic particles being utilized with 350° F. (177° C.) being useful for polyvinyl chloride (PVC) as polymerized (without additives) and commercially available.

The apparatus produces a sheet that is vastly superior to previous products, which is stress free and has greatly improved physical and mechanical properties. Surprisingly, sheets of plastic made from the highest molecular weights such as millions molecular weight polyethylene (MMwPE) are thermoformable when made by this process. Additionally, there is little or even no degradation even with materials in which high degradation is normally considered unavoidable. For example, MMwPE produces a stress free sheet that is completely undegraded and can be produced in any thickness ranging from very thin films to heavy weights. Among other attributes it is this freedom from stress that makes these MMwPE sheets thermoformable whereas such sheets produced by other methods (if they can be produced at all) are very difficult or impossible to thermoform.

Pure polyvinylchloride (PVC) sheet or film produced from polymerized plastic particles exhibits previously unobtainable properties. Among these are great impact strengths at far below freezing comparable to that at room temperature and the lack of the high degradation in a sheet of pure PVC which it is otherwise not possible to produce except by adding expensive additives. As another example, PTFE articles produced by this invention exhibit a much superior dielectric strength. By this process and equipment practically the whole range of thermoplastic materials can be processed.

Two or more dissimilar materials can be spread in layers to produce a cladding, laminating, or surfacing thus allowing different properties to be combined at low cost or, alternatively, incorporating properties otherwise unattainable in one material. As one example, it is possible to produce a laminate in one step. The plastic particle layer 83 may include at the upper surface thereof a second layer 83' of a different plastic polymer in order that the completed product comprise a plastic sheet having one plastic on one side and a different plastic on the other side. Still further, a wood, metal, or other like material may be place directly upon the polished plate 82 or the platen 80 and a layer of plastic particles 83 distributed thereover and then formed by this process such that the plastic particles are laminated directly to the wood, metal or other layer. Still further, one or more different polymeric materials can be spread in layers of the same or different thickness and simultaneously formed into film or sheet in one step. For example, normal molecular weight polyethylene may be spread in a layer 83' over a layer 83 of MMwPE placed on the polished sheet 82 in order to provide a cheap substrate (the upper layer 83') for facings (the layer 83) having low coefficients of friction. Various mixes of powders have been mixed with the plastic particles in layer 83 which have included graphite or molybdenum disulfide also for low coefficients of friction materials.

Still further, this invention permits the production of much wider sheets than those which are currently possible and at a lower cost, while also eliminating great problems in maintaining thickness tolerances. And, as indicated, products with unusual properties may be produced. For example, very large building panels of pure PVC powder may be used in layer 83' to provide a low cost high strength backing with superior impact strength onto which a weather-side surface may be produced simultaneously in one step by providing the layer 83 with a suitable powdered plastic of an acrylic or the like which is ultra-violet light absorptive. This provides unparalleled resistance to the elements on the exposed surface. The outer surface can also be made highly chemically resistant by using fluorinated materials in the layer 83.

Due to the broad applicability of this invention plastic articles having a wide variety of unusual characteristics may be produced. Indeed, it is possible to "engineer" many of the properties of the final product not previously possible. For example, this invention includes the ability to lower the heat requirement when melting crystalline materials such as polyethylene by as much as 20–25%. This results in a fast heating of the sheet when thermoforming with attendant savings in energy costs. Still further, the same sheet may be pelletized or ground for use as raw material for extrusion and injection processes and this raw material will require less total heat input to melt the plastic, thus making for a more economical operation.

It has even been found that some crystalline materials such as polyethylene, chlorotrifluoroethylene, polypropylene and the like may be processed in the sheet at below the melt temperature. It is only necessary that the temperatures in the large crystal growth range be held long enough in the compacted fine particles so that the crystals will grow across boundaries of the sufficiently small particles and form into a solid mass.

During the formation of the sheet from the plastic material 83 or 83 plus 83' any gases including air that surround the particles escape through the microporous parting sheet 84 and the wire screen 85 to the atmosphere. This is true also of any moisture that may be present which is vaporized and escapes in the same manner. Accordingly, as the sheet is being formed, it is formed substantially in the absence of air, moisture and oxygen and degradation is greatly lessened or avoided. Still further, there is no stress in the product since there is very little, if any, actual movement beyond that necessary to move from the particulate form into the solidified mass of the sheet, as mentioned above.

In producing articles with the apparatus of this invention, efficient results are often obtained from heating the bottom platen 80 only and using air pressure in the flexible envelope 86. As mentioned, however, the upper platen 88 may be heated by a suitable means. Still another alternative is to provide steam or hot liquids as the pressurizing fluid 87 in order to heat the diaphragm 90.

In addition to the formation of articles, in particular, sheets of plastic from plastic particles, the invention is also applicable to the welding of previously formed plastic sheets whether of the same or of different materials. For example, not only is it possible by this invention to make articles at far lower pressures (at 50 p.s.i. (3.52 kg/cm$^2$) or less) than materials such as MMwPE have heretofore required, but it may be used, with adaptation, to weld plastics which have previously been difficult or impossible to weld.

Figure 2:
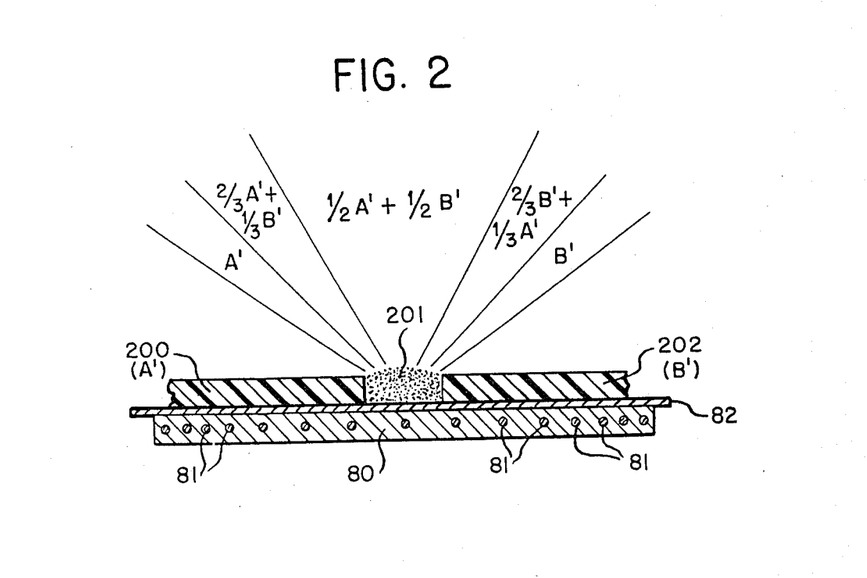
FIG. 2 illustrates a mixture of different plastic powders graded progressively when joining two dissimilar plastic sheets.

FIG. 2 shows the manner of welding a butt joint between two sheets of previously formed plastic sheet material 200 and 202. As shown in FIG. 2, only the lower platen 80 and the polished metal plate 82 are shown for simplicity. It will be appreciated that the upper platen 88 with its associated envelope 86 and diaphragm 90 together with the microporous parting sheet 84 and the wire screen 85 are also utilized in FIG. 2. The two sheets 200, 202 of plastic material to be joined are positioned on the polished plate 82 with their edges in spaced relationship as shown. In the space between their edges there is provided the plastic particulate material 201 to a depth to provide sufficient material for the proper thickness in the finished product to avoid either too thin or too thick a quantity of material at the finished joint. The particulate material 201 is preferably of the same polymer as the sheets 200 and 202. After supplying the material 201 to the space between the adjacent edges of the sheets 200, 202, the platens 80 and 88 are brought together as described above to provide a firm pressure on the particles 201. At least one of the platens 80 or 88 (preferably the lower platen 80) or both are heated and are maintained at a suitable temperature generally at or above the melt temperature of the plastic particles 201. After the diaphragm 90 has been brought to bear through the wire screen 85 and the microporous parting sheet 84 on the layer of plastic particles 201, pressure is supplied through conduit 91 to the fluid 87 and the diaphragm 90 to provide the requisite pressure for formation. After the plastic particles 201 have melted and formed the joint between the sheets 200 and 202, the pressure in envelope 86 is released and then the platens 80 and 88 are separated, and the polished plate 82 with the product thereon is removed from the apparatus. If no plate 82 is used then the product formed on platen 80 is usually cooled before it can be removed. For certain plastics or for reinforced articles cooling is not necessary. It will be appreciated that this apparatus and process is essentially the same as that described above with respect to FIG. 1 for the formation of a sheet excepting only that the elements 102 and 104 are not required and are instead replaced by the sheets 200, 202 of plastic material.

When the sheets 200 and 202 are of different plastic polymers it is preferred that the plastic particulate material 201 be composed of particles of the same two plastic polymers as the sheets 200 and 202. In many instances it suffices to spread the two different plastic polymer particles and have them meet directly in the joint 201; however, it is sometimes preferred to use a gradual gradation from the plastic on one side to that of the other. For example, assuming that sheet 200 is made of a first plastic polymer designated A' and the second sheet 202 is made of a different plastic polymer designated B', then a track of powders would be placed adjacent the sheet 200 which is entirely a powder of the A' polymer. Similarly a track of powder would be placed adjacent to the sheet 202 which is entirely of the B' polymer. Adjacent to the track of A' polymer would be placed a mixture of plastic particles comprised of, say, two-thirds of the A' polymer plus one-third of the B' polymer and adjacent to the track of B' polymer powder would be placed a track of powder comprising a mixture of, say, two-thirds of the B' polymer plus one-third of the A' polymer. In the middle a mixture of one-half of the A' polymer and one-half of the B' polymer is provided. After supplying these tracks of plastic particles the sheets 200, 202 and the power 201 are processed as above described for the joining of two sheets 200, 202 of the same polymer. While the ratios of two-thirds, one-third; one-half, one-half; and one-third, two-thirds have been mentioned by way of illustration, it will be appreciated that other proportions may be used and fewer or more tracks with lesser or greater gradual increase and decrease of the respective polymers may be utilized.

While the above description of the use of the invention for welding sheets of plastic material together has referred to the forming of butt type joints, and while a butt type joint is shown in FIG. 2, the invention is not so limited. It has been found equally as useful in forming overlapped joints in which the plastic particles are placed in one or more layers between the overlapped edges of the sheets. The layers of plastic powders may be graded with varying proportions as above described for the graded tracks of powders.

In the above description of welding two like or unlike pre-existing sheets of plastic together, the plastic powders used would form the weld with the adjacent sheets using the present invention. However, it sometimes happens that a plastic powder will not form a weld with a pre-existing sheet even when that sheet was produced from the same plastic as the powder. In order to join two unlike sheets together in such instances, the joint is formed at the same time as the sheets themselves using the present method and equipment.

The Examples below are illustrative of the application of the invention to the joining of unlike sheets at the same time that one or both of the sheets are formed.

EXAMPLE I

Pure polyvinyl chloride (PVC) was joined to millions molecular weight polyethylene (MMwPE). PUre PVC powder which was pure as polymerized (no additives) was spread to be formed into a sheet and pure finely powdered MMwPE powder was spread to become a sheet with the powders meeting at the middle. The two powders met directly without the use of any mixture or gradation of the powders therebetween other than what mixing may have resulted from the pressure subsequently applied. The materials assembled as just described were then treated as above described in an apparatus such as illustrated in FIGS. 1 and 2 and heated to a temperature above the melt of either plastic, in this case, at 392° F. (200° C.). Sheets of varying thicknesses from 0.043" (1.09 mm) to 0.051" (1.3 mm) were joined in this manner. In a tensile strength test to determine the strength of the joint, the joined sheet was placed in a test apparatus with the joint line transverse to the direction of pull. It was found that the MMwPE sheet parted at 23 pounds/0.1875" (10.4 kg/4.76 mm) width while the joint remained intact.

EXAMPLE II

A polyvinyl chloride (PVC) sheet 0.033" (0.84 mm) thick was joined to a millions molecular weight polyethylene (MMwPE) sheet 0.030" (0.76 mm) thick in the manner described above for Example I, excepting only that the PVC powder contained 2% of a tin stabilizer. The PVC powder met directly with the MMwPE powder with no gradation therebetween. The powders were then heated and processed in apparatus similar to that of FIGS. 1 and 2. In a tensile test of the joint it was found that the joint parted at 17 lbs/0.1875" (7.7 kg/4.76 mm) width which is approximately the tensile strength of MMwPE at that thickness. Subsequent tests demonstrated that the joint line strength is increased by the use of a single mixture of 50% PVC powder and 50% MMwPE powder. Still further improvement in the strength is achieved by use of the gradual increase of one and decrease of the other powder as above described with reference to the sheets 200, 202 when made respectively of polymers A' and B'.

EXAMPLE III

A PVC sheet was joined to a sheet of acrilonitrile butadiene styrene (ABS) while producing both sheets from powders. The sheets were of 0.024" (0.61 mm) in thickness. The PVC powder used contained 2% tin stabilizer. A finely powdered ABS resin was spread to meet the edge of the PVC powder directly without gradation therebetween. The assembly was then subjected to pressure and heat as described above in apparatus like that shown in FIGS. 1 and 2 to consolidate and form a joint. In a strength test in a tensile apparatus it was found that the ABS sheet parted at 23 lbs./0.1875" (10.4 kg/4.76 mm) width while the joint remained intact. The PVC sheet also remained intact.

EXAMPLE IV

A pre-existing commercially available PVC sheet was joined to a sheet of MMwPE as the sheet of MMwPE was formed. Pure PVC (without additives) powder was spread to meet the edge of the pre-existing sheet of PVC and MMwPE powder which was to become the MMwPE sheet was spread to meet the PVC powder directly and then processed as in Example I. Tests to separate the sheet were relatively crude and the tensile strength was not measured; however, the sheets did not part at the joint.

Accordingly, the present invention is applicable to the joining of two unlike sheets when both sheets are being formed as in Examples I, II, and III above or where one sheet already exists and the other sheet is formed at the time the joint is made as in Example IV above. In all instances the surface of the joint reflected the texture of the metal sheet 82 and the parting sheet 84, and was not detectable as a joint except as to color when color existed.

From the above examples, it is apparent that virtually any combinations of plastics may be welded or joined together with weld or joint strengths close to or equal to that of the sheet itself. In some cases the strength of the weld or joint is improved by a more gradual change of one plastic powder material to the other at the joint as previously described.

It has been noted that when pure PVC or MMwPE are used in this process either in the formation of sheets or in the formation of welds or joints, there is comparatively little or no degradation of these materials and they are substantially stress free even though these materials are not normally considered to be capable of formation into sheets, welds, or joints with less than a great amount of degradation unless the PVC is specially compounded or, in the case of MMwPE, a thickness greater than about one-half inch is used. Even with the 392° F. (200° C.) process temperature generally used with these examples, the present invention consolidates the plastic material in an extremely short dwell period above normal temperatures.

The following table is a useful guide in making first estimates of welding or joining temperatures:

| Plastic | Melt Point | Welding Temp. | Degradation |
| --- | --- | --- | --- |
| Pure Polyvinyl Chloride as polymerized | 335° F. (168° C.) (about) | 392° F. (200° C.) | Very slight |
| Pure Polyethylene or polymerized millions molecular weight | 280–290° F. (138–143° C.) | 392° F. (200° C.) | Not measurable (too slight) |
| Polyvinyl Chloride plus 2% tin stabilizer | 330–335° F. (166–168° C.) | 392° F. (200° C.) | Very slight |
| Pure ABS as polymerized Acrylonitrile-butadiene-styrene) | Below 300° F. (149° C.) | 392° F. (200° C.) | Not measurable |

The pressures necessary for welding or joining are the same as for making sheet and are very low and for some plastics may be only that obtainable from atmosphere and a partial vacuum.

The apparatus of this invention is capable of producing a number of unique new products having improved or new properties as will be apparent to those skilled in the art. Among these is the ability to produce wide thickness differences in the same sheet in which case more powder is used in the thicker areas and less in the thinner areas. Also different plastics may be used in different portions of the same sheet. Most notably plastic articles including sheets produced by the method and apparatus of this invention are stress free. Still further, it is possible by this method and apparatus to produce articles including sheets of various thicknesses from very thick to very thin films from materials which have not previously been considered capable of being formed into such sheets. Among these are plastic polymers having millions molecular weight including, particularly, MMwPE. Most importantly, articles including sheets of millions molecular weight plastics such as polyethylene can not only be produced by this invention which was not previously economically possible, but in addition, such sheets are stress free which also was not previously possible. A product that is free of stress is very important in a number of applications as will be appreciated by those skilled in the art since such products are dimensionally very stable under extremes of temperature and do not have the localized weaknesses often associated with products having stresses built into them during formation. Previous to this invention the use of plastic sheets was limited to those temperatures that would not excessively release the stresses built into the product. Sheets or other articles produced by this invention, however, can be used at any temperature the particular plastic will withstand.

While this invention has numerous applications in industry and can produce a very wide assortment of products including among others, sheet for use in the construction industry, in cladding, glazing for windows, and the like, one example described below is as a base or substrate for a mirror in place of the usual glass. This particular article is described below with reference to a second and third embodiment of the apparatus of this invention as shown in FIGS. 3 and 4.

Essentially, the apparatus of FIGS. 3 and 4 differs from that of FIGS. 1 and 2 in having two diaphragms one above and one below the sandwich. The diaphragms may be either single sheets of a heat resistant flexible material (FIG. 3) or the front face of a sealed envelope (FIG. 4). This arrangement permits the use of glass platens which has not heretofore been possible.

Figure 3:
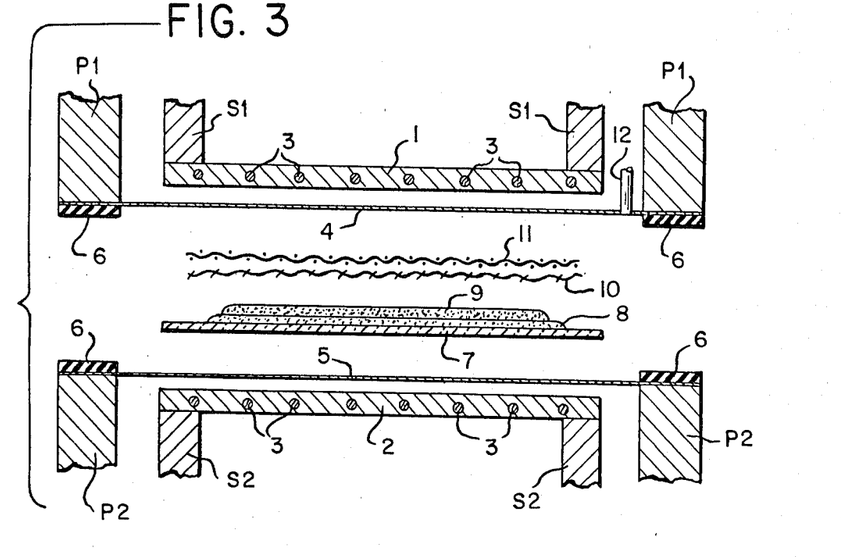
FIG. 3 is a schematic vertical section of another embodiment of the apparatus of the invention.
Figure 4:
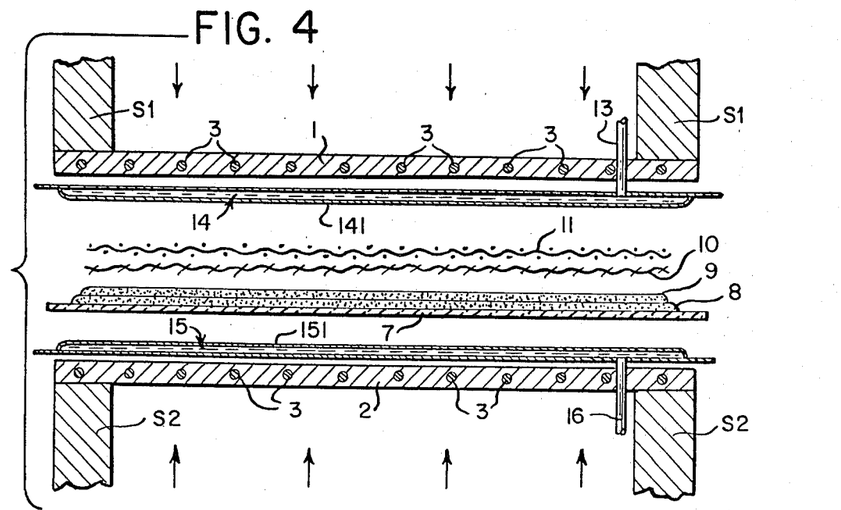
FIG. 4 is a schematic vertical section of yet another embodiment of the apparatus of the invention.

With reference to FIG. 3, there is shown an apparatus comprising support members S1 and S2 suitably mounted for relative movement. That is to say that either one or both of the support members S1, S2 may move toward and away from the other support member S1, S2. The upper support member S1 carries an upper platen 1 while the lower support S2 carries a lower platen 2. Each of the platens 1 and 2 incorporates heating cores 3 which may be electrical resistance heaters or tubes for carrying heated fluids, either gas or liquid. In place of heating cores 3 any of the heating mechanisms described above with reference to the apparatus of FIGS. 1 and 2 may be used.

As shown in FIG. 3, there is a top diaphragm 4 and a lower diaphragm 5 carried respectively by pressure frames or members P1 and P2 which may advantageously form part of the jaws of a press also incorporating the supports S1 and S2. The diaphragms 4 and 5 are shown as having peripheral gaskets 6 of a suitable resiliently compressible sealing material such as rubber. The gaskets are preferably also resistant to deterioration from heat and are preferably spaced a sufficient distance from platens 1 and 2 as to reduce the heat that impinges on said gaskets 6. The gaskets 6 may be forced into sealing contact by the pressure members P1 and P2.

As shown in FIG. 3, a master sheet 7 is positioned between the diaphragms 4 and 5. When producing a mirror, the sheet 7 is preferably of a high quality tempered or heat resistant glass highly polished although highly polished metal master plates 7 may also be used.

The apparatus also includes a microporous parting sheet 10 and a wire screen 11 like elements 84 and 85 described above with reference to FIG. 1.

In operation, a layer of powdered plastic material 8 is placed upon the master sheet 7. If desired, a second layer 9 of the same or a different plastic material and of the same or different color may be placed over the layer 8. The apparatus is then closed bringing frames P1 and P2 as well as the support frames S1 and S2 together with the gaskets 6 in gas sealing contact to provide a chamber. At the same time, the support frames S1 and S2 are firmly pressing upon the opposite sides of the sandwich comprised of the master sheet 7, the layer of plastic particles 8 (or layers of plastic particles 8, 9, etc.), the microporous parting sheet 10, and the wire screen 11. Either or both of the platens 1, 2 is heated to a temperature sufficient to melt the plastic particles making up the layer 8 (or the layers 8, 9, etc.). After sealing the gaskets 6 and bringing the platens 1 and 2 into firm pressing engagement with the sandwich 7, 8, 9, 10, 11, a partial vacuum is applied through the conduit 12 to the sealed space or chamber defined by the diaphragm 4 and 5 and the gaskets 6. In this way, a pressure is achieved on the outer side of the diaphragms 4 and 5 which is a function of the differential between the atmospheric pressure and the residual pressure within the chamber 4, 5, 6 resulting from the applied partial vacuum. This pressure though relatively low, is sufficient for the formation of many plastic particles (depending on their molecular weight and their flow properties at the melt) into articles and sheets in accordance with the present invention. This pressure applies a fluid pressure evenly over the whole area of the powdered layer 8 (or layers 8, 9, etc.). Also, due to the evenness of the pressure no damage such as cracking, or breaking of the glass master sheet 7 is experienced.

The gaskets 6 are kept sealed and the partial evacuation of the chamber 4, 5, 6 maintained long enough for the heat from platens 1 and 2 to penetrate into the plastic layer 8 (or layers 8, 9, etc.) to melt the plastic and to cause it to fuse under the applied heat and pressure into a coherent sheet. Thereafter the vacuum at conduit 12 is discontinued, the apparatus is opened, and the finished plastic sheet removed.

FIG. 4 shows an apparatus similar to that of FIG. 3 in which like elements are numbered with the same reference numerals. In FIG. 4, the pressure members P1, P2 are not utilized nor are the gaskets 6. Also, in FIG. 4, the diaphragms 4 and 5 have been replaced by sealed pressure envelopes 14 and 15 respectively having flexible diaphragm faces 141, 151 respectively. These sealed pressure envelopes 14 and 15 are mounted to support members S1 and S2 respectively by any known suitable means (not shown). It will be appreciated that while the pressure envelopes 14 and 15 are shown spaced from the platens 1, 2 for purposes of clarity, the same will be in contact with the platens 1 and 2 and may be secured directly thereto as with the envelope 86 shown in FIG. 1. Indeed, the apparatus of FIG. 4 is very similar to that of FIG. 1 accepting that the lower platen 2, unlike the lower platen 80 in FIG. 1, is also supplied with a sealed fluid envelope 15. Conduits 13 and 16 connect the interior of the fluid envelopes 14 and 15 respectively with a source of fluid under pressure. As with the apparatus of FIG. 1 the source of fluid pressure may be a hydraulic pump, an air compressor, or the like depending upon whether the fluid is a liquid such as water or hydraulic fluid or a gas such as air or an inert gas such as nitrogen.

In operation, the support members S1, and S2 are brought together with the sandwich comprising the master sheet 7, the layer of plastic particles 8 (or layers 8, 9 etc.), the microporous parting sheet 10, and the woven wire screen 11 all positioned as shown between the sealed envelopes 14 and 15. One or both of the platens 1 and 2 will have been previously heated to or above the melting point of the plastic particles to be molded. After the platens 1 and 2 are exerting a firm pressure upon the sandwich 7, 8, 9, 10, 11 through their respective envelopes 14 and 15, the fluid within envelopes 14 and 15 is pressurized by a suitable mechanism through the conduits 13 and 16 respectively. In this construction, it is essential that the platens 1 and 2 be supported by their support members S1 and S2 by a mechanism that not only applies the low pressure required but holds the pressure exerted by the platens 1 and 2. The fluid pressure in envelopes 14 and 15 causes the diaphragm faces 141 and 151 to bear with an even pressure over the entire area of the layer of particles to be formed into a sheet. This pressure is very even and adjusts automatically to insure evenness over the entire area. The pressure is kept applied in the envelopes 14 and 15 and the apparatus is kept closed to maintain the platens 1 and 2 in position for a time sufficient to achieve melting of the powdered plastic material and its consolidation into a homogeneous sheet. After formation, the fluid pressure is relieved through conduits 13 and 16 and thus from the envelopes 14 and 15 and then the apparatus is opened thus moving the platens 1 and 2 away from each other. The sandwich may then be removed and cooled sufficiently for the plastic to be removed from the master layer 7. In many applications it has been found that the fluid pressure applied to the envelopes 14 and 15 may be from below about 10 p.s.i. (0.73 kg/cm$^2$) to about 50 p.s.i. (3.52 kg/cm$^2$) depending upon such variables as the particular plastic being formed, its molecular weight and its flow properties, the nature of any embossings or debossings to be imparted to the plastic sheet from the master 7 and the like.

An alternative method of operating the apparatus of FIG. 4 comprises first pressurizing the envelopes 14, 15 with fluid pressure while the apparatus is open and support members S1, S2 separated wholly or partly. This pressuring of the envelopes 14, 15 causes them to balloon outwardly at a very low pressure such as about 1–5 p.s.i. (0.073–0.365 kg/cm$^2$). At this point, the conduits 13, 16 are turned off thus maintaining the fluid under pressure in the envelopes 14, 15. Thereupon, the apparatus is operated to cause the platens 1, 2 to close together with the necessary additional pressure being supplied by the apparatus itself, for example, with the usual hydraulic or fluid rams such as used in presses.

In all cases, any air, gas, or moisture which might otherwise tend to become trapped within the final sheet (as the plastic powder melts and forms into the sheet) passes out through the microporous parting sheet 10, the air escape wire screen 11 and then to the atmosphere with any moisture being coverted to vapor and escaping in the same manner.

The diaphragms 4, 5, 141 and 151 as well as the entire envelopes 14 and 15 may be made of any suitable metal or plastic material as mentioned above that will stand the pressures and temperatures involved. A copper sheet of 0.030" (0.76 mm) in thickness and a stainless steel sheet of the 400 series of 0.020" (0.51 mm) in thickness have been used successfully. Thicknesses of up to about 0.06" (1.5 mm) are also very useful.

The coherent plastic sheet produced reflects the high polish of the master sheet 7 and equals the best that can be produced in glass. If desired the master sheet 7 may be etched or have other surface ornamentation which will be reproduced in the final plastic sheet. Because of the very even fluid pressure applied by the diaphragms there is no cracking or breaking of the master sheet 7 even when it is made of glass.

Because of the extremely smooth and polished surfaces obtainable the sheet produced can be used in many applications where glass is used. In one application it serves well as a mirror. Indeed reflective materials bond with greater strength to the plastic sheets produced by this invention than to glass. This is contrary to previous experience since heretofore polystyrene has been nearly impossible to silver plate directly without an intermediate coating or other treatment. Also, mirrors made from such sheets provide strikingly better reflectivity. When producing sheets to be used as a mirror care must be taken to avoid any release agent on the surface and if release agents are used on the master sheet 7 they must be cleaned off thoroughly from the final plastic sheet. Other than for this, no special treatment such as chemical etchings or corona discharge are necessary.

Silver spray plating has proved very efficient and economical in the production of mirrors from sheets produced in accordance with this invention. A presently preferred procedure for the application of such a reflective coating is as follows:
  (a) cleaning and water rinsing to obtain a release free and fingerprint free surface
  (b) a sensitizing spray is applied
  (c) a water rinse
  (d) a silver solution is sprayed evenly over the surface
  (e) a thorough water rinse is applied
All of the above steps (a) through (e) may be performed automatically on equipment conventionally used for glass mirrors. It is presently preferred to produce mirrors of the "first surface" type rather than of the "second surface" type as is usual with glass. That is to say that the reflective coating is placed upon the front surface of the sheet of plastic rather than the rear surface as is common with glass mirrors. In order to protect the silver plating in such first surface mirrors it must be covered with a suitable transparent abrasion resistant coating for example an acrylic coating which is preferably sprayed on.

A preferred material for this abrasion resistant coating is the class of glass resin polymers described in U.S. Pat. No. 3,451,838. These polymers cure to an abrasion resistant glass-like hard thermoset material that is insoluble in most common solvents non-yellowing and highly light transmitting above about 1900 Å. A 40% solution of such a glass resin in butanol with about 5% of a catalyst has proven successful. A thickness of 0.001" (0.025 mm) has been found adequate.

The recommended cure time by the manufacturer of the glass resin utilized was 16–24 hours at 275° F. (135° C.). This recommended cure temperature and time is uneconomically long and the temperature excessive for the polystyrene homopolymer mirror sheet 0.09" (2.29 mm) thick which was used to produce a mirror by this invention since the material melts at about 280° F. (138° C.). The total of heat and curing time was reduced to six minutes or less by the use of radiant heat evenly applied from above. This radiation strikes the silver plating which reflects back well over 90% of the radiation reaching it. The resin coating therefore heats very quickly while the other side of the sheet heats only very slowly. A temperature of 400° F. (204° C.) is reached very rapidly (about four minutes or less) and a cure of the glass resin is achieved at this temperature before there is damage to the underlying polystyrene sheet.

Figure 5:
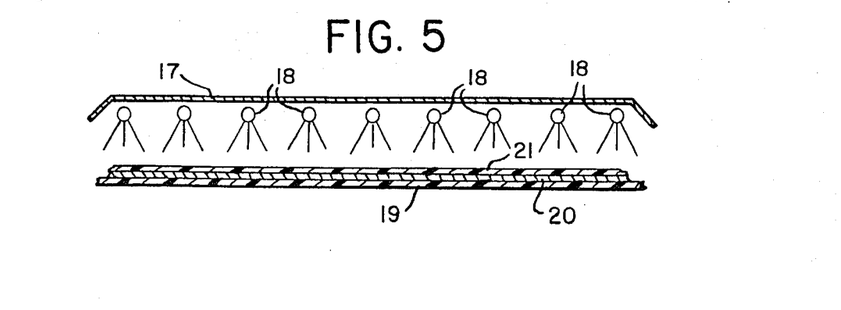
FIG. 5 is a schematic side elevation illustrating the curing of an abrasion resistant coating applied to the silvered face of a plastic sheet when producing a mirror in accordance with the invention.

FIG. 5 shows an apparatus for curing in accordance with the just described procedure. As shown in FIG. 5 there is a highly reflective stainless steel panel 17 having a plurality of radiant heating coils 18 positioned therebelow. A polystyrene homopolymer sheet 19 produced by the present invention either by the apparatus of FIG. 3 or FIG. 4 and 0.09" (2.29 mm) thick, having a molecularly thin silver layer 20 thereon, and having a film coating 21 of a glass resin as described above was cured as shown in the apparatus of FIG. 3. The complete operation was completed in about six minutes as above mentioned.

Mirrors produced in accordance with this process appear, to the lay observer, to have a greatly magnifying effect due to the fact that such a mirror does not experience the 10–15% light loss which is common to second surface glass mirrors.

In all of the above embodiments of the apparatus of this invention the heating of the platens may commence before or after the platens are brought together or before or after fluid pressure is applied to the plastic particles by the diaphragm or diaphragms. The particular sequence will depend upon a number of variables including the particular equipment being used, time to heat the platens and the plastic, the temperature required, etc. In all instances, however, the plastic particles consolidate into the article while at or above their melt temperature and while they are at the same time being subjected to the fluid pressure applied by the diaphragm or diaphragms.

I claim:
1. An apparatus for making a plastic article from finely divided plastic particles utilizing heat and pressure comprising: a pair of members movable relative to each other, the first of said members including a flexible diaphragm positioned in opposed relationship to the second of said members, a microporous air release and parting means positioned between said flexible diaphragm and said second member, means for applying fluid pressure to said diaphragm to cause said diaphragm to press against plastic particles positioned between said diaphram and said second member, and means for heating said plastic particles while applying pressure thereto to melt and consolidate the same and to produce thereby a stress-free plastic article.

2. The apparatus of claim 1 in which said flexible diaphragm comprises one face of a sealed envelope.

3. The apparatus of claim 1 in which said second member includes a flexible diaphragm and means for applying fluid pressure to both of said flexible diaphragms.

4. The apparatus of claim 3 in which sealing means is provided at the edges of at least one of said two flexible diaphragms whereby said diaphragms may be sealed together to form an enclosed chamber when said members are moved to a position adjacent to each other, and means for drawing a partial vacuum in said enclosed chamber to cause said opposed flexible diaphragms to collapse inwardly toward each other and to press against said plastic particles positioned therebetween.

5. The apparatus of claim 3 in which both of said flexible diaphragms comprise faces of sealed opposed envelopes.

6. The apparatus of any of claims 1 through 5 in which said microporous air release and parting means comprises a wire screen and a polytetrafluoroethylene coated fiberglass fabric positioned between said wire screen and said plastic particles.

7. The apparatus of any of claim 1 through 13 in which said microporous air release and parting means is a polytetrafluoroethylene coated wire screen.

8. The apparatus of claim 1 in which each of said members and said microporous air release and parting means is a continuous belt.

* * * * *